Jan. 19, 1954  H. T. RIGHTS  2,666,900
SYNCHROSCOPE
Filed Feb. 21, 1948
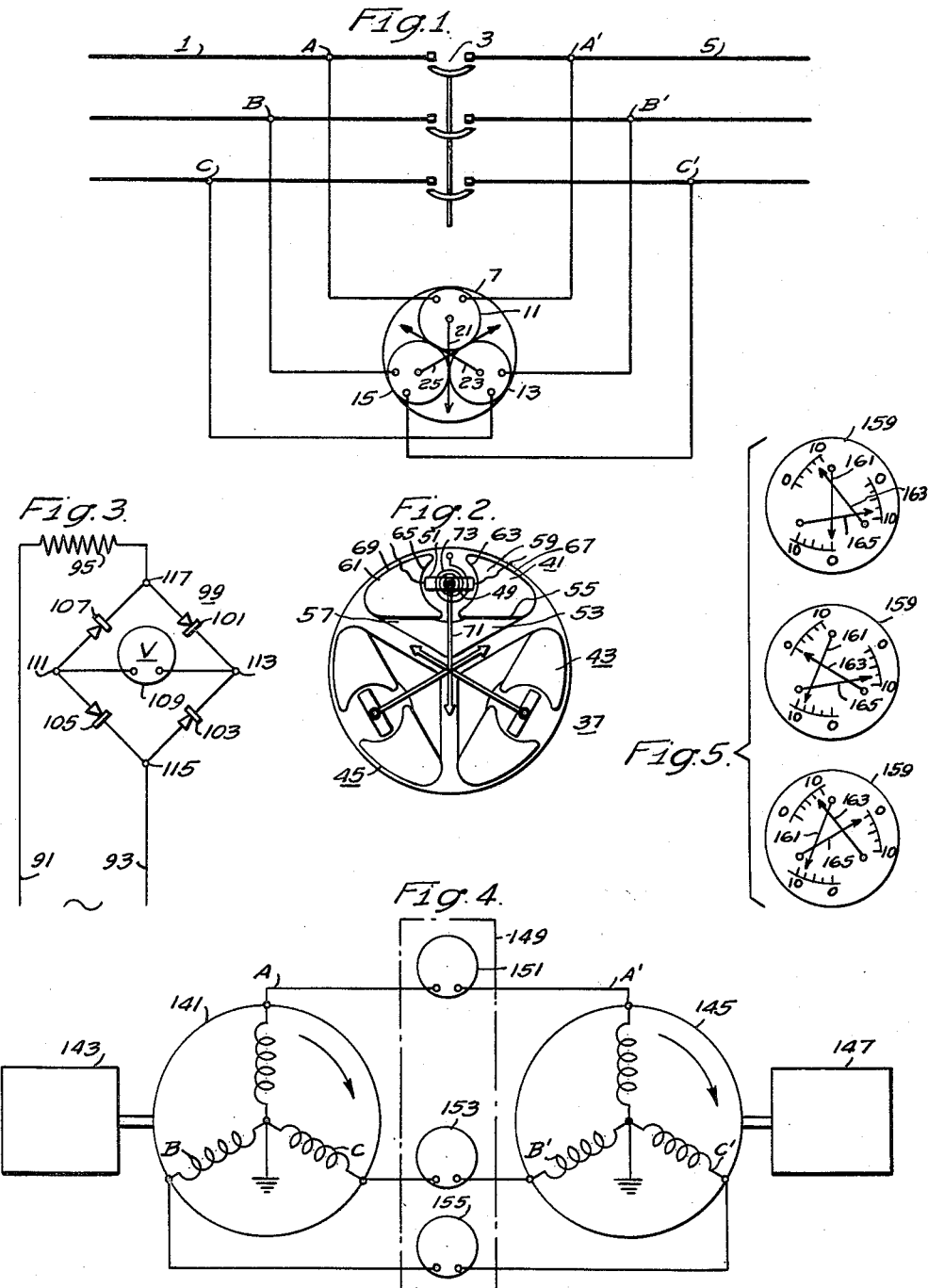
WITNESSES:
E. A. M'Closkey
Arthur S. Stewart
INVENTOR
Herbert T. Rights.
BY C. L. Freedman
ATTORNEY Patented Jan. 19, 1954

2,666,900

UNITED STATES PATENT OFFICE 2,666,900

SYNCHROSCOPE

Herbert T. Rights, New Brunswick, N. J., assignor to Westinghouse Electric Corporation, East Pittsburgh, Pa., a corporation of Pennsylvania Application February 21, 1948, Serial No. 10,101

4 Claims. (Cl. 324—91)

This invention relates to synchroscopes and circuits therefor and more particularly to devices for indicating the synchronization of polyphase alternating current systems and rotating machines.

Among the more common types of synchroscopes in present-day use are synchroscopes of the moving iron-vane type and the electrodynamic type. Lamps are also employed as synchronous indicators because of their simplicity but have a relatively high burden and are not sensitive to slight variations in voltage. Synchroscopes of the instrument type when used on 100 or 120 volt, 60 cycle system, usually consume about three watts. In accordance with the invention it is proposed to provide a synchroscope for polyphase systems which will consume only about 5% of this power, or less, according to the design.

To indicate the synchronization of machines such as the engines of a multi-engined craft for example, tachometers have been employed. Tachometers, however, are not accurate and very frequently fail to indicate the relative speed of two engines within an accuracy of twenty revolutions per minute. In accordance with the invention, it is also proposed to provide a simple, accurate and low-burden synchroscope for such machines employing polyphase generators.

It is, therefore, an object of the invention to provide a novel, improved, reliable, low-burden synchroscope.

It is a further object of the invention to provide a compact device for indicating both synchronization and synchronized speed and/or frequency of two polyphase generators.

It is an additional object of the invention to provide a synchroscope system employing a conventional type of electrical measuring instrument.

It is another object of the invention to provide an improved synchroscope of the multiple-instrument type capable of indicating which of two generators is rotating the faster.

It is another object of the invention to provide an electrical measuring instrument having a permanent magnet structure which is shaped to be positioned in a sector of a circle.

It is a further object of the invention to provide a synchroscope which employs a rectifier and a D'Arsonval type of instrument.

It is a still further object of the invention to provide a measuring device employing a plurality of electrical measuring instruments having indicators which traverse a common dial.

Other objects of the invention will be apparent from the following description taken in conjunction with the accompanying drawing in which:

Figure 1 is a diagrammatic view of a synchronous indicating device associated with two three-phase systems.

Fig. 2 is a schematic view showing the arrangement and certain details of an indicating device embodying three electrical measuring instruments.

Fig. 3 is a diagrammatic view of a bridge circuit employed with a direct-current measuring instrument.

Fig. 4 is a diagrammatic view of a synchronous indicating device associated with two, three-phase generators which are driven by rotating machines to be synchronized, and Fig. 5 is three views showing the face of an indicating device and the relative positions of the indicators on a common dial for three different phase relationships between two three-phase systems.

Referring to the drawing, Figure 1 shows a three-phase system 1 which may be connected by means of a circuit breaker 3 to a three-phase system 5. System 1 has phases or terminals A, B and C which correspond to phases or terminals A', B', and C', respectively, of system 5. An indicating device 7 comprising electrical measuring instruments 11, 13 and 15, is connected between systems 1 and 5. The instruments 11, 13 and 15 may be any conventional alternating current measuring instrument such as an alternating-current voltmeter, or may be a combination of a rectifier and direct-current electrical measuring instrument as hereinafter more fully described. The instrument 11 is shown connected between phases or terminals A and A' of the two systems. Instrument 13 is connected between phases or terminals C and B' and instrument 15 is connected between phases or terminals B and C'.

It is to be observed that the instrument 11 is connected between corresponding phases or terminals of systems 1 and 5 and that instruments 13 and 15 are connected between the other differing phases or terminals of the systems 1 and 5.

In the indicating device 7 the instruments 11, 13 and 15 are positioned equidistant from each other. Each of the instruments 11, 13 and 15 has indicators or pointers 21, 23 and 25, respectively. When the instruments are deenergized, the pointers 21, 23 and 25 which are in different planes intersect when in zero position at a common point in the center as shown in the drawing.

Referring to Figure 2, an indicating device 37 is shown comprising three permanent-magnet moving-coil instruments 41, 43 and 45. Since the construction of the instruments 41, 43 and 45 is identical, we may confine our discussion to the instrument 41 which comprises a magnet-structure 49 and a moving-coil 51. The magnet-structure 49 comprises an angular permanent-magnet 53 having legs 55 and 57 which are at an angle of approximately 120° to each other. A pole tip 59 which is preferably formed of soft iron is associated with the leg 55 of the permanent magnet 53. Similarly a pole tip 61 is associated with the leg 57 of the permanent magnet 53. The pole tips 59 and 61 have pole salients with arcuate concavities 63 and 65, respectively, facing each other to form a substantially cylindrical opening within which the moving coil 51 may rotate. Each of the pole tips 59 and 61 have arcuate surfaces 67 and 69, respectively, on the side thereof opposite the permanent magnet 53, the arcuate surfaces having a radius approximating the radius of the indicating device 37 in which the magnet structure 49 is positioned. It will be observed that the outline of the magnet-structure 49 is substantially sector-shaped and is designed to occupy almost one third of a circle. It will also be observed that the magnet structures of the instruments 41, 43 and 45 are spaced apart to minimize the effects of one magnet structure upon another.

Although the instruments 41, 43 and 45 are identical, it is to be pointed out that the positions of the indicators or pointers for the instruments 41, 43 and 45 are adjusted so that each pointer rotates in a different plane to avoid contact or interference with any other.

The electrical measuring instrument 41 is provided with an indicator 71 which is associated with the moving coil 51. In accordance with the usual practice, a helical spring 73 is affixed between the moving coil 51 and the stationary portion of the electrical measuring instrument 41, such as its magnet structure 49, to effect a bias on the moving coil 51 to oppose movement of the indicator 71 in the up-scale or clockwise direction from a zero position wherein the coil is de-energized.

As is well understood in the art, suitable bearing assemblies (not shown) are provided to permit rotation of the moving coil 51 and the indicator 71 when a change in the energization of the instrument takes place.

In Figure 3 a conventional type of bridge rectifier circuit is shown associated with a direct-current electrical measuring instrument. The leads 91 and 93 may be connected between the conductors of a suitable alternating current source, such as between phases of two three-phase systems or two three-phase generators. The lead 91 is shown connected through a resistor 95 to a full-wave bridge-type rectifier 99. The rectifier 99 comprises rectifiers 101, 103, 105 and 107, which may be of the copper-oxide type, and are positioned in the four legs of the bridge circuit. An electrical measuring instrument of the direct-current type, is connected between terminals 111 and 113 of the bridge circuit. The lead 93 is connected to a terminal 115 of the bridge circuit and the resistor 95 is connected to a terminal 117.

As is well-known in the art, when a positive potential is applied to the lead 91, current flows through the resistor 95 to the terminal 117 through the rectifier 101 to the terminal 113, from the terminal 113 through the direct current instrument 109 to terminal 111, from terminal 111 through the rectifier 105 to terminal 115, and from terminal 115 to the lead 93.

If, on the other hand, a positive potential is applied to the lead 93, current flows through the lead 93 to the terminal 115, from the terminal 115 through rectifier 103 to the terminal 113, from the terminal 113 through the direct-current electrical measuring instrument 109 to the terminal 111, from the terminal 111 through the rectifier 107 to the terminal 117, and from terminal 117 through the resistor 95 to the lead 91.

It is to be observed that in both cases current flows from the terminal 113 through the measuring instrument 109 to terminal 111 whether the positive potential is applied to the lead 91 or 93. In other words, a unidirectional current is applied to the instrument 109 irrespective of the direction of the current in the leads 91 and 93 or irrespective of the fact that alternating current is applied to the leads 91 and 93. With an increase in voltage-difference between the leads 91 and 93, the indicator for the measuring instrument moves in the up-scale direction.

Fig. 4 shows a three-phase alternating-current generator 141 which is driven by a rotating device, such as a machine, prime mover, or motor 143. Similarly, a three-phase alternating current generator 145 is driven by a rotating device, such as a machine, prime mover or motor 147. Phases A, B and C of the generator 141 respectively correspond to phases A', B' and C' of the generator 145. Phases A, B and C of the generator 141 are connected through a measuring device 149 (shown in broken lines) to the phases A', B' and C' of the generator 145. The measuring device 149 comprises electrical measuring instruments 151, 153 and 155, each of which may employ a bridge circuit as shown in Fig. 3 and a D'Arsonval type of electrical measuring instrument as shown in Fig. 2.

The electrical measuring instrument 151 has its terminals connected between phases A and A' of the generators 141 and 145. The electrical measuring instrument 153 has its terminals connected between phases C and B' of the generators 141 and 145, and the electrical measuring instrument 155 has its terminals connected between phases B and C' of generators 141 and 145.

As pointed out with reference to Figure 1, one electrical measuring instrument, instrument 151, is connected between corresponding phases of the two generators or systems, and the remaining two electrical instruments, instruments 153 and 155, are connected between differing remaining phases of the two generators or systems.

To facilitate describing the operation of Figure 1, it will be assumed that the voltages are alike in each phase of the three-phase systems 1 and 5. It will also be assumed that all the instruments rotate in a clockwise direction when an increase in voltage is applied to the terminals of the instruments.

In Figure 1 the circuit breaker 3 is to be closed to connect the systems 1 and 5 only when the two systems are in synchronism and the proper phase relationship exists between the two systems. With the two systems in synchronism and in phase, the indicator of the voltmeter 11 will remain at zero and the voltmeters 13 and 15 will indicate a voltage which is the $\sqrt{3}$ of the voltage between any phase and ground. With a slight difference in frequency, the indicators or pointers 21, 23 and 25 will outline a triangular figure which will rotate and shift about the face of the indicating device 7. The direction in which the triangle rotates about the dial of the indicating device 7, indicates which system has the greater frequency.

As the systems gradually approach synchronism, the speed at which the triangle rotates gradually decreases. The indicators and the triangle outlined, become stationary when the two systems are in synchronism. Although the two systems are in synchronism, the two systems are out of phase until the indicator 21 of instrument 11 is at its zero position. When indicator 21 remains at the zero position, the circuit breaker 3 may be closed to connect systems 1 and 5 together.

Referring to Fig. 4 it may be assumed that the generators 141 and 145 are identical and rotate in a clockwise direction, as indicated by the arrows.

Although the generators 141 and 145 may have a direct-current field winding, it is believed preferable to employ a three-phase, tachometer-type of generator having a permanent-magnet field if the invention is to be employed on aircraft where simplicity, minimum weight and compactness are important.

With the use of a low-burden synchroscope of the type herein described, the small tachometer-type of generator can be used therewith to supply the very small amount of electrical energy required. The electrical measuring instruments 151, 153 and 155 are preferably arranged so that their pointers rotate on a common dial.

It may be assumed that Fig. 5 shows the face of the indicating device 149 in Fig. 4. Pointers 161, 163 and 165 have a common face or dial 159, and each has an axis of rotation which is equidistant from the axes of rotation of the other two pointers. The face or dial 159 has a suitable indicia or scale for each of the pointers 161, 163 and 165. It may also be assumed that pointer 161 is the indicator for instrument 151 and that pointers 163 and 165 are pointers for instruments 153 and 155, respectively. When the pointers 161, 163 and 165 arrange themselves and remain in the positions shown in the first or top view of Fig. 5, the pointer 161 indicating zero voltage, the generators 141 and 145 and the motors 143 and 145 are in synchronism and are in the same phase relationship. If the generators 141 and 145 are not in synchronism and the motors 143 and 147 associated therewith respectively, are operating at different speeds, the indicators of the instruments 151, 153 and 155 will tend to oscillate at a rate which is the difference in speed between the two motors. As the motors approach synchronization, the speed of the oscillation will decrease and when the motors are rotating at the same speed the pointers will remain stationary. Although the two motors may be operating at the same speed and the generators may have the same frequency, the generators may not be in phase. The relative phase positions of the generators may be further adjusted so that the instrument 151 continues to indicate a zero voltage.

The second or middle view of Fig. 5 shows the relative position of the indicators that is maintained when the generator 145 is lagging the generator 141 by 120° or leading the generator 141 by 240°. The third or bottom view of Fig. 5 shows the relative position of the pointers that is maintained when generator 145 is leading generator 141 by 120° or lagging generator 141 by 240°.

It is to be observed that in each of the views in Fig. 5 a triangle is outlined by the pointers and one and only one pointer in each view is at the zero position. Although each of the three views shows one of the indicators at zero position, it is to be pointed that in intermediate positions or other phase relationships, none of the pointers indicate zero but the pointers nevertheless continue to outline a triangle.

If, for example, a pilot were to operate a multi-engined airplane with a synchroscope as herein described, the synchroscope having a face or dial 159 with pointers arranged thereon as shown in Figure 5, the movement of the pointers and the rotation of the triangle outlined thereby would attract his attention and indicate that the engines were out of synchronism. If the triangle outlined by the pointers rotates in a clockwise direction, the pilot immediately realizes that the engine or motor 143 is rotating faster than the engine or motor 147. By gradually decreasing the speed of motor 143, the rate at which the triangle outlined by the pointers rotates will decrease and eventually the triangle will become stationary. However, if the triangle outlined by the pointers subsequently begins to rotate in a counter-clockwise direction, the pilot realizes that he has decreased the speed of the motor 143 to too great an extent. By adjusting the relative speeds of the motors 143 and 145, the pilot can observe the indicators on the dial 159 and know that the motors are in synchronization when there is no movement of the indicators. When the generators 141 and 145 are in synchronism and their phase relationships are such that the indicator 161 is at the center or zero position, the remaining two indicators 163 and 165 with the aid of suitable scales or the dial 159, indicate the speed of the motors, or frequency of the synchronized generators. In other words, the indicating device 149 is capable of indicating synchronized speed or frequency as well as synchronization.

Although the invention has been described with reference to certain specific embodiments thereof numerous modifications are possible. Therefore, the appended claims have been drafted to cover not only the specific embodiments therein, but also all other embodiments falling within the spirit and scope of the invention.

I claim as my invention:

1. Apparatus for indicating the phase relationship between two, three-phase systems comprising three electrical measuring instruments with indicators, each electrical measuring instrument being connected between the two, three-phase systems, the first one of the electrical measuring instruments being responsive to a difference in voltage between corresponding phases of the two, three-phase systems, a second one of the electrical measuring instruments being responsive to a difference in voltage between other differing phases of the two, three-phase systems, and a third one of the electrical measuring instruments being responsive to a difference in voltage between differing remaining phases of the two, three-phase systems, the indicators associated with the electrical measuring instruments traversing a common dial and overlapping to define a triangle when one or more of the electrical measuring instruments is energized.

2. A synchroscope for connection between two three-phase electrical systems comprising in combination, three electrical measuring instruments with indicators associated therewith, said indicators traversing a common dial and outlining a triangle when one or more of said electrical measuring instruments is energized, the position of said triangle conveying information as to phase relationships between the two systems.

3. A synchroscope for connection between two three-phase electrical systems, having in combination two groups of terminals, each group comprising a first, second and third terminal for connection to the respective phases of one of the three-phase electrical systems and three electrical measuring instruments associated with a common dial, each electrical measuring instrument being connected between the two groups of terminals and having an indicator which rotates in only one predetermined upscale direction about an axis when an electrical quantity is applied to said instrument, the first of said electrical measuring instruments being connected between the first terminals of the two groups, the second of said electrical measuring instruments being connected between the second terminal of one group and the third terminal of the other group and the third of said electrical measuring instruments being connected between the remaining terminals of the two groups, said three electrical measuring instruments being angularly positioned about a second axis parallel to the axes about which the indicators rotate, said indicators being of a length to extend beyond said second axis and being disposed to overlap above said dial when the instruments are deenergized, said indicators operating to define a triangular pattern which is rotatable in a direction dependent upon the relative frequencies of the systems.

4. A synchroscope for connection between two three-phase systems, having in combination two groups of terminals, each group comprising a first, second and third terminal for connection to the respective phases of one of the three-phase electrical systems and three electrical measuring instruments associated with a common dial, each electrical measuring instrument being connected between the two groups of terminals and having an indicator which rotates in only one predetermined upscale direction about an axis irrespective of the direction of the flow of current between the terminals to which the instrument is connected, the axes about which such indicators rotate, being substantially parallel to and equidistant from a second axis toward which the indicators are directed when the instruments are deenergized, said indicators being of a length to extend beyond said second axis and being disposed to overlap one another above said dial when the instruments are deenergized, the first of said electrical measuring instruments being connected between the first terminals of the two groups, the second of said electrical measuring instruments being connected between the second terminal of one group and the third terminal of the other group and the third of said electrical measuring instruments being connected between the remaining terminals of the two groups, said indicators cooperating to form a triangular pattern which is rotatable in a direction dependent upon the relative frequencies of the systems, and said indicators also cooperating when said systems are in synchronism to indicate by their relative positions the phase relation of said electrical systems.

HERBERT T. RIGHTS.

References Cited in the file of this patent

UNITED STATES PATENTS

| Number | Name | Date |
| --- | --- | --- |
| 600,981 | Weston | Mar. 22, 1898 |
| 649,942 | Michalke | May 22, 1900 |
| 713,346 | Pratt | Nov. 11, 1902 |
| 791,785 | Hertzberg | June 6, 1905 |
| 1,091,722 | Wolcott | Mar. 31, 1914 |
| 1,669,159 | Duncan et al. | May 8, 1928 |
| 2,051,061 | Tonnies | Aug. 18, 1936 |
| 2,106,064 | Rich | Jan. 18, 1938 |
| 2,170,835 | Simon | Aug. 29, 1939 |
| 2,218,697 | Burkhart | Oct. 22, 1940 |
| 2,249,452 | Boekels et al. | July 15, 1941 |
| 2,309,927 | Beede | Feb. 2, 1943 |
| 2,384,316 | Lamb | Sept. 4, 1945 |

FOREIGN PATENTS

| Number | Country | Date |
| --- | --- | --- |
| 484,775 | Germany | Oct. 22, 1929 |